United States Patent [19]  [11] 4,387,202
Falbe et al.  [45] Jun. 7, 1983

[54] POLYMERIZATION USING MIXED ALUMINUM COMPOUNDS

[75] Inventors: Jürgen Falbe; Boy Cornils; Günter Hetkamp, all of Dinslaken, Fed. Rep. of Germany; Karl Otterbein, deceased, late of Oberhausen, Fed. Rep. of Germany, by Maria Otterbein, heiress; Wolfgang Payer, Wesel; Peter Schneller, Oberhausen, both of Fed. Rep. of Germany

[73] Assignee: Ruhrchemie Aktiengesellschaft, Oberhausen, Fed. Rep. of Germany

[21] Appl. No.: 331,099

[22] Filed: Dec. 15, 1981

Related U.S. Application Data

[63] Continuation of Ser. No. 69,489, Aug. 24, 1979, abandoned.

[30] Foreign Application Priority Data

Aug. 28, 1978 [DE] Fed. Rep. of Germany ....... 2837481

[51] Int. Cl.$^3$ .............................................. C08F 4/30
[52] U.S. Cl. ..................................... 526/138; 526/82; 526/348.2; 526/348.6
[58] Field of Search ................................... 526/138, 82

[56] References Cited

U.S. PATENT DOCUMENTS

| | | | |
|---|---|---|---|
| 2,822,357 | 2/1958 | Brebner et al. | 526/138 |
| 3,108,973 | 10/1963 | Vandenberg | 526/153 |
| 3,592,880 | 7/1971 | Diedrich et al. | 260/878 |
| 3,773,735 | 11/1973 | Diedrich et al. | 260/88.2 R |
| 4,004,071 | 1/1977 | Aishima et al. | 526/116 |
| 4,048,419 | 9/1977 | Frese et al. | 526/153 |
| 4,059,720 | 11/1977 | Kolling et al. | 526/138 |

FOREIGN PATENT DOCUMENTS

| | | |
|---|---|---|
| 825958 | 12/1959 | United Kingdom . |
| 828958 | 2/1960 | United Kingdom . |
| 882200 | 11/1961 | United Kingdom . |
| 1525912 | 9/1978 | United Kingdom . |

*Primary Examiner*—Stanford M. Levin
*Attorney, Agent, or Firm*—Sprung, Horn, Kramer & Woods

[57] ABSTRACT

A process is described for the polymerization of ethylene or copolymerization of ethylene with a $C_3$ to $C_{15}$ alpha olefin in solution, suspension or in the gas phase at 20° to 250° C. and 1 to 100 bars in the presence of a mixed catalyst comprising a separately produced halogen-containing titanium(III) compound and an organoaluminum compound while controlling the molecular weight with oxygen, wherein a mixture of organoaluminum compounds is employed comprising a halogen-containing aluminum alkyl and a trialkyl aluminum compound in a molar ratio of 1:0.05 to 1:20, the combined amount of organoaluminum compounds being present in an amount of 0.01 to 20 moles per one mole of halogen-containing Ti(III) compound.

4 Claims, No Drawings

POLYMERIZATION USING MIXED ALUMINUM COMPOUNDS

This is a continuation, of application Ser. No. 69,489, filed Aug. 24, 1979, abandoned.

BACKGROUND OF THE INVENTION

1. Field of the Invention

This invention relates to a process for controlling the average molecular weight and the molecular weight distribution of α-olefin polymers and copolymers. This invention is directed to a process for preparing olefin polymers of average molecular weight of 50,000 to 1,000,000 and S values of 7 to about 13.

2. DISCUSSION OF THE PRIOR ART

According to the process developed by Ziegler, catalysts consisting of compounds of the transition metals of groups 4 to 6 of the Periodic Table of elements, preferably titanium compounds, and of organometallic compounds of elements of groups 1 to 3 of the Periodic Table, especially aluminum alkyls or alkyl aluminum halides, are used for the polymerization and copolymerization of alpha olefins at low pressure. The reaction of the olefins to form polymers is preferably carried out in suspension or solution but may also be carried out in the gas phase.

The process described above gives products which can be processed to injection molded articles, hollow articles, pipe, tube or film by injection molding, blow molding and extrusion processes. Each molding process and each field of use requires products having different physical properties for which especially the average molecular weight of the polymer and the distribution of molecular weights are decisive. Both of these factors take account of the fact that the macromolecular materials obtained by the synthesis are invariably polymolecular materials. They consist of macromolecules which are built up from the same basic units but differ by the degree of polymerization. The statement of the average molecular weight of a macromolecular material represents, therefore, merely the average value of the molecular weight for the particular polymolecular mixture.

Various methods such as osmometry, measurement of scattering of light, viscosimetry and sedimentation behavior in the ultracentrifuge are available for determining the average molecular weight.

However, many properties of macromolecular material such as toughness, hardness, elasticity, solubility or processibility, e.g., by extrusion, are not only determined by the average molecular weight but depend also on the scattering or dispersion of the molecular weight of the macromolecules of various size present as mixture. High impact strength (notched) which is a criterion of brittleness and toughness of a material is characteristic of polymers having narrow molecular weight distribution. Polymers having a broad molecular weight distribution are characterized by improved flow and enhanced resistance to stress cracking corrosion. Therefore, it is not sufficient to describe a macromolecular material only by the average molecular weight, it is rather necessary to supplement this value by mentioning the molecular weight distribution.

To measure its molecular weight distribution, the macromolecular material is separated into individual fractions and the quantity and molecular weight of these fractions are determined. This method is time-consuming and circumstantial. Therefore, one is contented in general with an approximative determination of the molecular weight distribution. One possible method is the determination of the flow behavior of the polymers. For example, the quotient from the melt indices of a material measured at different loads (Melt Flow Index$_5$ or Melt Flow Index$_{15}$ according to Deutsche Industrie Norm 53 735) is a measure of the width of its molecular weight distribution. The quotient from MFI$_5$ and MFI$_{15}$ is referred to as S value. Low S values mean narrow and high S values mean broad molecular weight distributions. For example, S values of about 5 to about 20 are characteristic of polyethylene.

Polyolefins having narrow molecular weight distribution, i.e., S values of 6 to 7 and low molecular weight of about 20,000 to 40,000, are particularly useful for processing by injection molding while products having a broad molecular weight distribution, i.e., S values of 13 to 17, and relatively high molecular weights of about 80,000 to 200,000 can be processed particularly well by extrusion.

Control of a molecular weight which is favorable for further processing is effected by varying the reaction conditions, especially the polymerization temperature, varying the ratio of the catalyst components or adding chain transfer agents to the reaction mixture. Hydrogen is preferred as chain transfer agent. Corresponding processes are disclosed, for example, in German Pat. No. 1,420,390 and German Auslegeschrift (DE-AS) 1,595,666. The processes described in the publications mentioned above give products which have a narrow molecular weight distribution, i.e., S values of 6 to 7, and are preferably suitable for processing by injection molding. In the process according to German (BRD) Offenlegungsschrift No. (DE-OS) 1,720,611, ethylene or mixtures of ethylene with up to 10% by weight of higher alpha olefins are polymerized in two steps in suspension or in the gas phase while controlling the average molecular weight with hydrogen to achieve a broader molecular weight distribution. Monomer mixtures of different compositions are preferably used in the two steps.

Apart from hydrogen, alcohols and/or oxygen are also used in some cases for controlling the average molecular weight. Such a method in which catalysts of titanium tetrachloride and dialkyl aluminum monochloride are used is described in German Pat. No. 1,210,987. It gives polymers having S values of about 13 to 15.

The processes described above for the control of the average molecular weight and the molecular weight distribution do not meet all requirements of practice. In particular, they do not provide a simple route to the production of polymers which are useful for the production by extrusion of molded articles having smooth surface and high toughness. While it is possible by addition of hydrogen in the polymerization of alpha olefins to control the average molecular weight within wide limits, the resultant products show a narrow molecular weight distribution with the disadvantages mentioned above. On the other hand, addition of alcohols and/or oxygen permits the production of polymers having a broad molecular weight distribution. With this control system, the average molecular weight can be varied only within narrow limits. Multistage processes for the production of polymers having specific average molecular weights and specific molecular weight distributions are technically expensive and circumstantial and can be carried out only discontinuously in many cases and, therefore, are not always suitable for the economic production of the polymers.

A method solving the problems mentioned above is described in German (BRD) Offenlegungsschrift (DR-OS) No. 2,630,262 which describes a process for the polymerization or copolymerization of ethylene with the use of catalysts which contain a trialkyl aluminum compound as one constituent, wherein oxygen in addition to hydrogen is added to the olefin or olefin mixture. This process gives polymers which have the properties desired, but the relatively high consumption of catalyst appears to be disturbing in large-scale operation of the process.

SUMMARY OF THE INVENTION

Polymers the average molecular weight of which may be varied within wide limits, i.e., from about 50,000 to about 1,000,000, and the molecular weight distribution of which corresponds to S values of about 7 to about 13 are surprisingly furnished with low catalyst consumption by a process for the polymerization of ethylene or copolymerization of ethylene with $C_3$ to $C_{15}$ alpha olefins in solution, in suspension or in the gas phase at 20° to 250° C. and 1 to 100 bar in the presence of a mixed catalyst comprising a separately produced halogen-containing titanium (III) compound and a mixture of organoaluminum compounds while controlling the molecular weight with oxygen and, if necessary or desired, hydrogen, said mixture of organoaluminum compounds comprising a halogen-containing aluminum alkyl and trialkyl aluminum compounds in a molar ratio of 1:0.05 to 1:20, the combined amount of organoaluminum compounds being present in an amount of 0.1 to 20 moles per mole of halogen-containing Ti(III) compound.

It is preferred to carry out the process according to the invention in solution or suspension desirably at temperatures of 60° to 90° C. and pressures of 2 to 20 bars. Saturated hydrocarbons are especially used as solvents or suspending agents.

According to the new mode of operation, ethylene may be polymerized alone but also together with $C_3$ to $C_{15}$ alpha olefins. It is recommended to add the alpha olefins in amounts up to 5% by weight, based on ethylene. Particularly suitable are propane, butene or hexene.

Titanium trichloride is especially used as halogen-containing titanium(III) compound. However, other chlorine-containing compounds of trivalent titanium, above all titanium alkoxy chlorides of the general formula $Ti(OR)_nCl_{3-n}$ wherein R is an alkyl group having up to 10 carbon atoms and n is 1 or 2 may also be used. The titanium(III) compounds are obtained by reduction of the corresponding titanium(IV) compounds, this reduction being carried out separately from the actual formation of the catalyst, i.e., the mixture of Ti(III) compound and organoaluminum compound. Preferred reducing agents include organic aluminum compounds such as alkyl aluminum sesquichloride, dialkyl aluminum monochloride, alkyl aluminum dichloride, trialkyl aluminum, isoprenyl aluminum or mixtures of these aluminum compounds. However, alkyl aluminum hydrides and organometallic compounds such as diethyl zinc may also be used. The reduction of the titanium-(IV) compound may also be effected by reaction with metallic aluminum. It is carried out in an inert dispersing agent at temperatures of −60° to +120° C., preferably at −10° to 30° C. The reaction product is purified by washing it with the dispersing agent.

An essential feature of the process according to the invention is the use of a mixture of halogen-containing aluminum alkyls and trialkyl aluminum compounds as catalyst component. Halogen-containing aluminum alkyls which may be used for the new mode of operation can be described by the general formula $AlR_nX_{3-n}$ wherein R stands for alkyl groups having 1 to 40 carbon atoms, preferably 2 to 4 carbon atoms, X is halogen and n may be 1, 1.5 or 2. Examples of compounds of this kind include diethyl aluminum chloride, ethyl aluminum dichloride or the equimolar mixture of diethyl aluminum chloride and ethyl aluminum chloride (sesquichloride corresponding to n=1.5 in the general formula given above). The trialkyl aluminum compounds contained in the mixture contain like or different alkyl groups having 1 to 40 carbon atoms, preferably 2 to 12 carbon atoms. Examples of compounds of this kind include triethyl aluminum, tripropyl aluminum, triisobutyl aluminum, trioctyl aluminum or tridodecyl aluminum.

The use of 0.5 to 3 moles of organoaluminium compound per mole of titanium(III) compound has been found to be particularly advantageous. The molar ratio of the halogen-containing aluminum alkyl compound to trialkyl aluminium is preferably 1:0.1 to 1:5. About 0.5 to 3 moles of catalyst are used per one kilogram of polyethylene.

The ratio of the halogen-containing aluminum alkyl to trialkyl aluminum determines the S value of the polymer and, consequently, the range of molecular weight distribution. Mixtures of halogen-containing aluminum alkyls and trialkyl aluminum compounds having a high proportion of aluminum alkyl halide, i.e., of about 1:2, give products having S values of about 9. The control of the molecular weight is effected by means of oxygen which is added to the olefin or olefin mixture in amounts of 5 to 100 cu.cm. per std.cu.m. of ethylene. The average molecular weight decreases as the amount of oxygen increases.

Together with oxygen, an alcohol may also be used for molecular weight control. Its concentration in the reaction mixture is not critical, but an increase in the alcohol proportion at a given ratio of aluminum alkyl halide to trialkyl aluminum results in a decrease in the S value. Examples of alcohols which may be used in the polymerization process according to the invention include ethanol, propanol, isopropanol, butanols, pentanols. Preferably, butanol is used in amounts of 0.02 to 0.5 ml per std.cu.m. of ethylene. The average molecular weight may also be influenced by additionally adding hydrogen. However, the sensitivity of the system to hydrogen is low so that the control with oxygen is preferred.

The new mode of operation furnishes polymers which are particularly well suited for molding by extrusion. Molded articles of polymers produced by the process are characterized by high toughness and satisfactory surfaces.

EXAMPLES

The process according to the invention is illustrated in greater detail by the examples 3 to 5 which are described hereafter and in which the new catalyst system according to Example C was used. These experiments are compared with experiments 1 and 2 in which the polymerization was carried out with catalyst systems of the prior art corresponding to Examples A and B.

The values given in the tables have the following meanings:

MFI$_{190/5}$; MFI$_{190/15}$ (g./10 min)

Melt index corresponding to Deutsche Industrie Norm 53 735 and ASTM D 1238-65 T at a temperature of 190° C. and a load weight of 5 kgs. and 15 kgs., respectively.

S value $$\text{Quotient from the melt indices } \frac{MFI_{190/15}}{MFI_{190/5}}$$

Melt rupture

Appearance of a rough or irregular surface of an extrudate (e.g., internal surface of a pipe) at a critical shearing rate.

When extruding polyethylene samples of comparable molecular weight, that means with the same MFI value, at a constant shearing rate, there is a dependence between the occurrence of melt rupture and the range of the molecular weight distribution (see Kunststoff-Handbuch C. Hanser Verlag, Munich, Vol. I; 4.3.7 Dr. G. Döring, Rheologie von Kunststoffen).

Preparation of the polymerization catalysts

EXAMPLE A:

Into a 3 liter three-neck flask provided with a stirrer were charged under a nitrogen atmosphere 556 mmoles of diethyl aluminum chloride (DEAC) dissolved in a hydrocarbon fraction (b.p, 140° to 170° C.). During the course of 4 hours, 460 mmoles of TiCl$_4$ which is also dissolved in the abovementioned hydrocarbon fraction were added dropwise. The temperature was maintained at 20° to 22° C.

TiCl$_3$ was precipitated as a fine brown precipitate. Upon completion of TiCl$_4$ addition, stirring was continued for further 6 hours at a temperature of 20° to 22° C. The resultant suspension may, after appropriate dilution, be used for the polymerization without further activation by Al alkyls.

EXAMPLE B:

The TiCl$_3$ precipitate obtained in Example A was decanted from the supernatant solution after settling and repeatedly washed with the above-mentioned hydrocarbon fraction until the aluminum concentration in the washing liquid was=0.2 mmoles/liter. After appropriate dilution, triethyl aluminum (TEA) in a ratio of TEA:TiCl$_3$=1.2 was added for the polymerization.

EXAMPLE C:

Into a 3 liter three-neck flask provided with a stirrer were charged under a nitrogen atmosphere 600 mmoles of isoprenyl aluminum dissolved in a hydrocarbon fraction (b.p., 140° to 170° C.).

After having cooled the solution to 0° C., 1200 mmoles of TiCl$_4$ were added dropwise within a period of 5 hours. During the dropwise addition and further 3 hours, the temperature in the reaction vessel was maintained at 0° C. After the TiCl$_3$ precipitation had settled, the supernatant solution was sucked off and the TiCl$_3$ precipitate was again diluted with the above-mentioned hydrocarbon fraction. Mixtures of ethyl aluminum dichloride EADC) with triethyl aluminum TEA) in various relative proportions and different amounts were added for the polymerization.

Preparation of the polymers

EXAMPLE 1

(comparison)

Into a 40 liter double-jacket pressure reactor filled with a hydrocarbon fraction (b.p., 140° to 170° C.) were introduced continuously at 80° C. and 3 to 4 bars per hour 800 liters of ethylene, 20 g. of hexene-1, 1 liter of catalyst suspension obtained in Example A comprising 3.65 mmoles of TiCl$_3$ and 4.38 mmoles of DEAC and 200 ml of air and the mixture was allowed to react.

The characteristics of the resultant polyethylene powder are summarized in Table 1.

EXAMPLE 2

(comparison)

Into the pressure reactor used in Example 1, 800 liters of ethylene, 20 g. of hexene-1, 1 liter of a catalyst suspension containing 4 mmoles of TiCl$_3$ component and 4.8 mmoles of triethyl aluminum, hydrogen in amounts sufficient that its concentration in the gas space was 50 to 60%, and (a) 0, (b) 50, (c) 150 and (d) 250 ml of air were introduced continuously per hour at 75° to 80° C. and 3 to 4 bars.

The characteristics of the resultant PE powders are summarized in Table 1.

EXAMPLE 3

Into the pressure reactor used in Example 1, 800 liters of ethylene, 20 g. of hexene-1, hydrogen at a rate sufficient that its concentration in the gas space is 15 to 30%, 50 to 100 ml of air, 1 liter of catalyst suspension containing 1.5 mmoles of TiCl$_3$ component and the following mixtures of ethyl aluminum dichloride (EADC) and triethyl aluminum (TEA) were introduced continuously per hour at 75° to 80° C. and 3 to 4 bars:

(a) 0.75 mmoles of EADC+1.5 mmoles of TEA
(b) 0.75 mmoles of EADC+0.75 mmoles of TEA
(c) 1.5 mmoles of EADC+0.75 mmoles of TEA The characteristics of the resultant PE powders are summarized in Table 1.

EXAMPLE 4

Into the pressure reactor used in Example 1 were charged, in contrast to Example 3, 30 g. of butene-1 in place of 20 g. hexene-1, and an aluminum alkyl mixture consisting of 1.2 mmoles of EADC+1.5 mmoles of TEA.

The characteristics of the resultant PE powder are shown in Table 1.

EXAMPLE 5

Into the pressure reactor used in Example 1 were charged no comonomers in contrast to Example 3 and an aluminum alkyl mixture comprising 1.2 mmoles of EADC and 1.5 mmoles of TEA.

The characteristics of the resultant PE powder are shown in Table 1.

EXAMPLE 6

Into the pressure reactor used in Example 1, 800 liters of ethylene, 20 g. of hexene-1, hydrogen at a rate sufficient that its concentration in the gas space was 15 to 20%, 20 to 50 ml of air, 1 liter of catalyst suspension comprising 2.5 mmoles of TiCl$_3$ component of Example B and a mixture of 1.5 mmoles of ethyl aluminum dichloride and 1.5 mmoles of triethyl aluminum were continuously charged per hour at 75° to 80° C. and 3 to 4 bars. The resultant polymer had a MFI 190/5 of 0.5 g./10 min, an S value of 11.0 and an impact strength (notched) according to Deutsche Industrie Norm 53 453 of 15 mJ/mm². When extruding a 32 ND 10 pipe, a smooth surface without melt fracture was obtained.

TABLE 1

Summary of the results of the experiments

| Experiment No. | Catalyst | MFI$_{190/5}$ g/10 min | $S = \frac{MFI_{190/15}}{MFI_{190/5}}$ | Melt fracture 32 ND 10 pipe | Impact Strength (notched) DIN 53 453 mJ/mm² |
|---|---|---|---|---|---|
| 1 | A | 0.29 | 13 | no | 7–9 |
| 2a | B | 0.35 | 6.6 | melt fracture | 20 |
| 2b | B | 0.34 | 7.0 | no | 20 |
| 2c | B | 0.29 | 7.5 | no | 19 |
| 2d | B | 0.32 | 8.9 | no | 15 |
| 3a | C | 0.67 | 9.1 | no | 18 |
| 3b | C | 0.69 | 11.5 | no | 14 |
| 3c | C | 0.65 | 13 | no | 10.5 |
| 5 | C | 0.40 | 10.5 | no | 10 |
| 4 | C | 0.61 | 10.5 | no | 11 |

We claim:

1. In a process for the polymerization of ethylene or copolymerization of ethylene with a $C_3$ to $C_{15}$ alpha olefin in solution, suspension or in the gas phase at 20° to 250° C. and 1 to 100 bars in the presence of a mixed catalyst containing separately produced titanium trichloride (III) and an organoaluminum compound while controlling molecular weight with oxygen, the improvement wherein:
   (a) a mixture of organoaluminum compounds is employed comprising ethyl aluminum dichloride and triethyl aluminum in a molar ratio of 1:0.05 to 1:20;
   (b) the combined amount of said organoaluminum compounds present being 0.1 to 20 mols per mol of titanium trichloride (III) compound; and
   (c) hydrogen is added to the polymerization reaction mixture during polymerization to control molecular weight.

2. A process according to claim 1, wherein an alcohol is added to the polymerization reaction mixture during polymerization to control molecular weight or molecular weight distribution.

3. A process according to claim 1, wherein the ratio of ethyl aluminum dichloride to triethyl aluminum ranges between 1:0.1 and 1:5.

4. A process according to claim 1 wherein the mixture of organoaluminum compounds is used in an amount of 0.5 to 3 moles per one mole of titanium trichloride (III) compound.

* * * * *